United States Patent
Rejae et al.

(10) Patent No.: US 9,449,649 B1
(45) Date of Patent: Sep. 20, 2016

(54) DISK DRIVE HAVING A SHROUD WALL THAT COMPLETELY ENCIRCLES A DISK OUTER PERIPHERY

(75) Inventors: Hamid R. Rejae, San Carlos, CA (US); Joseph T. Lin, Cupertino, CA (US); Jon E. Jacoby, San Jose, CA (US); Arman V. Golgolab, Los Altos, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 1185 days.

(21) Appl. No.: 12/792,873

(22) Filed: Jun. 3, 2010

(51) Int. Cl.
*G11B 33/14* (2006.01)
*G11B 33/08* (2006.01)

(52) U.S. Cl.
CPC ............. *G11B 33/14* (2013.01); *G11B 33/08* (2013.01); *G11B 33/148* (2013.01)

(58) Field of Classification Search
CPC . G11B 33/08; G11B 33/1486; G11B 33/148; G11B 33/14
USPC ................. 360/97.14, 97.13, 97.12, 98.01
See application file for complete search history.

(56) References Cited

U.S. PATENT DOCUMENTS

| | | | |
|---|---|---|---|
| 5,483,398 A * | 1/1996 | Boutaghou | 360/99.16 |
| 5,629,820 A * | 5/1997 | Koriyama | 360/244.2 |
| 5,631,787 A | 5/1997 | Huang et al. | |
| 5,696,649 A * | 12/1997 | Boutaghou | 360/97.16 |
| 5,898,545 A * | 4/1999 | Schirle | 360/254.7 |
| 6,125,003 A * | 9/2000 | Tsuda | G11B 5/6005 |
| | | | 360/99.18 |
| 6,369,978 B1 | 4/2002 | Shimizu et al. | |
| 6,456,454 B1 * | 9/2002 | Slezak | 360/97.12 |
| 6,498,704 B1 * | 12/2002 | Chessman et al. | 360/265.9 |
| 6,510,021 B1 * | 1/2003 | Woldemar et al. | 360/99.18 |
| 6,665,139 B2 | 12/2003 | Tokuyama et al. | |
| 6,714,379 B1 | 3/2004 | Thompson et al. | |
| 6,728,062 B1 | 4/2004 | Ou-Yang et al. | |
| 6,791,790 B2 | 9/2004 | Lee | |
| 6,922,308 B1 | 7/2005 | Butler | |
| 6,930,856 B2 | 8/2005 | Wang et al. | |
| 6,999,273 B2 * | 2/2006 | Tsang | G11B 17/038 |
| | | | 360/97.16 |
| 7,002,774 B2 | 2/2006 | Adams | |
| 7,012,781 B2 * | 3/2006 | Chee et al. | 360/99.19 |
| 7,054,103 B2 | 5/2006 | Tadepalli et al. | |
| 7,203,030 B2 * | 4/2007 | Chan | G11B 5/6005 |
| | | | 360/97.15 |
| 7,268,972 B2 * | 9/2007 | Akama | G11B 5/54 |
| | | | 360/97.13 |
| 7,460,333 B2 * | 12/2008 | Akamatsu et al. | 360/97.12 |
| 7,733,602 B2 * | 6/2010 | Gross et al. | 360/97.14 |
| 7,813,078 B1 * | 10/2010 | Gleason | G11B 5/54 |
| | | | 360/254.4 |
| 8,031,430 B2 * | 10/2011 | Chan et al. | 360/97.13 |
| 8,274,754 B2 * | 9/2012 | Chan | G11B 5/012 |
| | | | 360/97.13 |
| 2003/0151847 A1 * | 8/2003 | Tsang | G11B 17/038 |
| | | | 360/97.16 |
| 2006/0126216 A1 * | 6/2006 | Sorrell et al. | 360/97.01 |
| 2006/0187579 A1 * | 8/2006 | Xu et al. | 360/97.02 |
| 2008/0247092 A1 | 10/2008 | Minami et al. | |
| 2013/0188280 A1 * | 7/2013 | Sawanaka | G11B 25/043 |
| | | | 360/99.08 |
| 2014/0126084 A1 * | 5/2014 | Nakamiya | G11B 21/22 |
| | | | 360/97.12 |

* cited by examiner

*Primary Examiner* — Julie Anne Watko

(57) ABSTRACT

A disk drive includes a disk that has a data side and an unread side. A first read head faces and is adjacent the data side. The disk drive also includes a cylindrical shroud wall that is substantially orthogonal to the unread side and that completely encircles the disk outer periphery. A radial spacing between the cylindrical shroud wall and the disk outer periphery nowhere exceeds 1 mm. The disk drive does not include any read head that faces and is disposed adjacent the unread side.

17 Claims, 3 Drawing Sheets

DISK DRIVE HAVING A SHROUD WALL THAT COMPLETELY ENCIRCLES A DISK OUTER PERIPHERY

BACKGROUND

Disk drives are a type of information storage device that store information on at least one spinning disk. Other types of information storage devices include, for example, magnetic tape drives which retrieve stored information on magnetic tape (e.g. linear tape drive, helical scan tape drive). There are several types of disk drives. For example, there are so-called floppy disk drives, which store information on removable magnetic disks. There are also optical disk drives, which typically retrieve information stored on removable optical disk media. Magnetic hard disk drives typically store information on non-removable rigid magnetic disks. Also for example, there are magneto-optical disk drives, which share some of the characteristics of optical disk drives and magnetic hard disk drives.

The contemporary magnetic hard disk drive 100 that is shown in FIG. 1 includes a disk drive base 102 and at least one annular magnetic disk 104. Each disk 104 is rotated by a spindle 106 that is attached to the disk drive base 102. Each disk 104 includes a plurality of magnetic tracks for storing data, disposed upon opposing major surfaces of the disk 104. The data of the plurality of magnetic tracks is written and read by a head 122 that is attached to and is part of head gimbal assembly (HGA) 124. HGA 124 is attached, typically by swaging, to an arm 114 of rotary actuator 110. Rotary actuator 110 is rotably attached to the disk drive base 102 via a pivot bearing cartridge 118. During operation, the rotary actuator 110 is rotated by action of voice coil motor (VCM) 112 to position the head(s) at desired data tracks on the surfaces of the disk(s) 104. When the disk drive is not in operation, the heads are retracted from the disk surface by a head loading ramp 120.

The disk drive base 102 includes an arcuate shroud wall that is disposed closely around a portion of the outer periphery of the disk 104. Such a base feature may somewhat reduce or attenuate disk flutter and other dynamic vibrations. However, the beneficial effect of such shrouding may be diminished because the shroud must have a large opening or gap (at the left side of disk 104 in the view of FIG. 1) to allow access and movement by the arm(s) 114 of the actuator 110, between and over the disk surfaces. Therefore, the arcuate shroud cannot completely encircle the disk 104, but rather spans an arc that is much less than 360 degrees. Contemporary disk drives also typically include other openings or gaps in the shroud. For example, the disk drive base 102 of FIG. 1 includes an additional shroud gap to accommodate recirculation filter 108, and another shroud gap to direct air flow induced by the rotation of the disk(s) 104 to the recirculation filter 108.

Therefore, there is a need in the art for a practical disk drive design that can enhance the performance of a stationary shroud in attenuating disk flutter and other dynamic vibrations.

DETAILED DESCRIPTION OF EXAMPLE EMBODIMENTS

Figure 1:
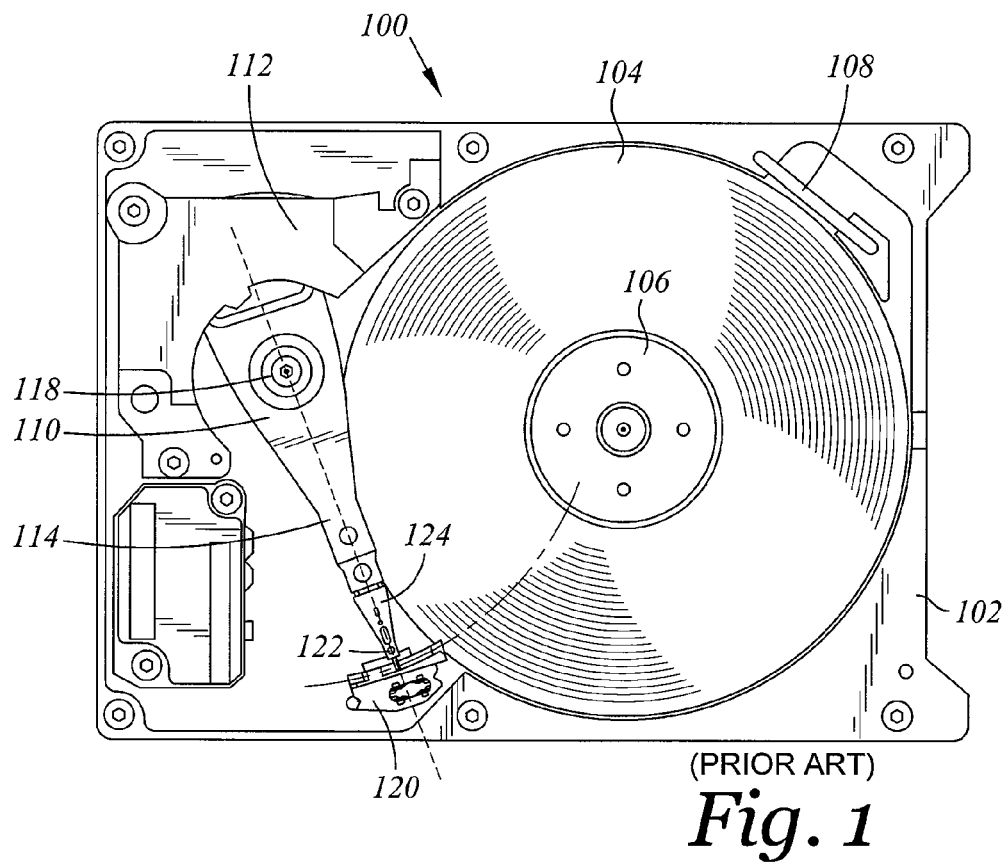
FIG. 1 is a top view of a contemporary disk drive.
Figure 2:
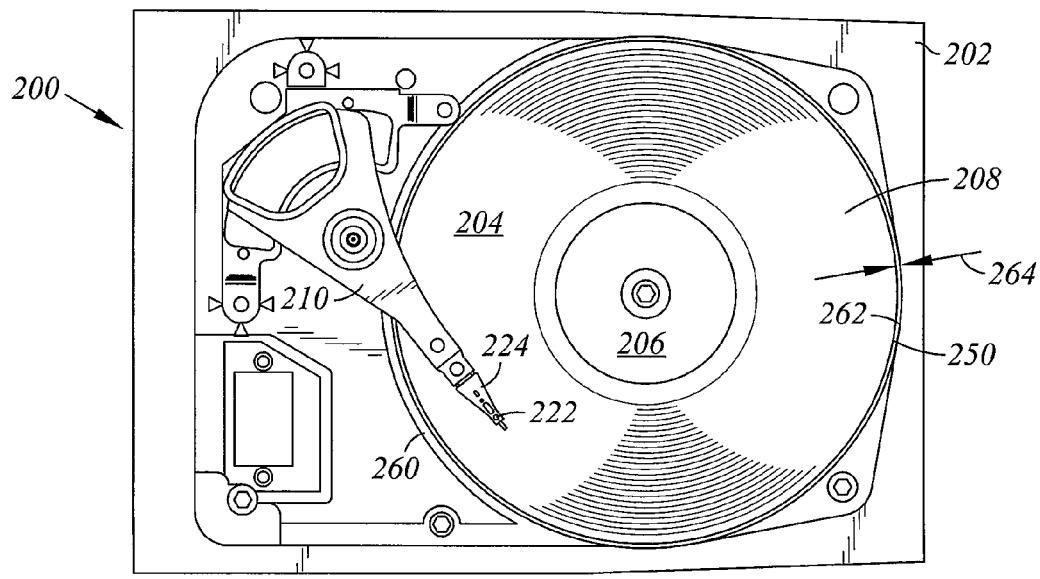
FIG. 2 is a top view of a disk drive according to an embodiment of the present invention.

FIG. 2 is a top view of a disk drive 200 according to an embodiment of the present invention. The disk drive 200 includes a disk drive base 202, and a disk drive cover that would be attached to the disk drive base 202. However, the disk drive cover is not shown in the view of FIG. 2 so that the internal components of the disk drive 200 may be visible. The disk drive 200 also includes a spindle 206 attached to the disk drive base 202. A first disk 204 is attached to the spindle 206. The first disk 204 has a first disk data side 208 and a first disk unread side (not visible because it would be the disk underside as viewed in FIG. 2) that is opposite the first disk data side 208.

As shown in FIG. 2, the first disk 204 also has a first disk outer periphery 250. The disk drive 200 also includes a first read head 222 that faces and is disposed adjacent the first disk data side 208. In this context, a "read head" includes any head that can read, whether or not it can also write or perform other functions, and "adjacent" means that no other facing disk surface is closer to the read head 222. The first read head 222 is attached to and is a subcomponent of a head gimbal assembly (HGA) 224 that is positioned by a rotary actuator 210. The first disk data side 208 need not actually include stored data to be considered as a "data side." Rather, any disk side that faces and is adjacent a read head qualifies as a "data side."

In the embodiment of FIG. 2, the disk drive 200 also includes a first shroud 260 having a first cylindrical shroud wall 262 that is substantially orthogonal to the first disk unread side (and to the first disk data side 208) and that completely encircles the first disk outer periphery 250. In this regard, the phrase "completely encircles" means either that there is no gap in the shroud 260 or else that each gap in the shroud 260 is substantially filled by another component such as a head loading ramp. In the embodiment of FIG. 2, a radial spacing 264 between the first cylindrical shroud wall 262 and the first disk outer periphery 250 nowhere exceeds 1 mm. Also, in the embodiment of FIG. 2, the first cylindrical shroud wall 262 is an integral feature of the disk drive base 202, but in certain alternative embodiments the first shroud may contact and be attached to the disk drive base 202 instead.

Figure 3:
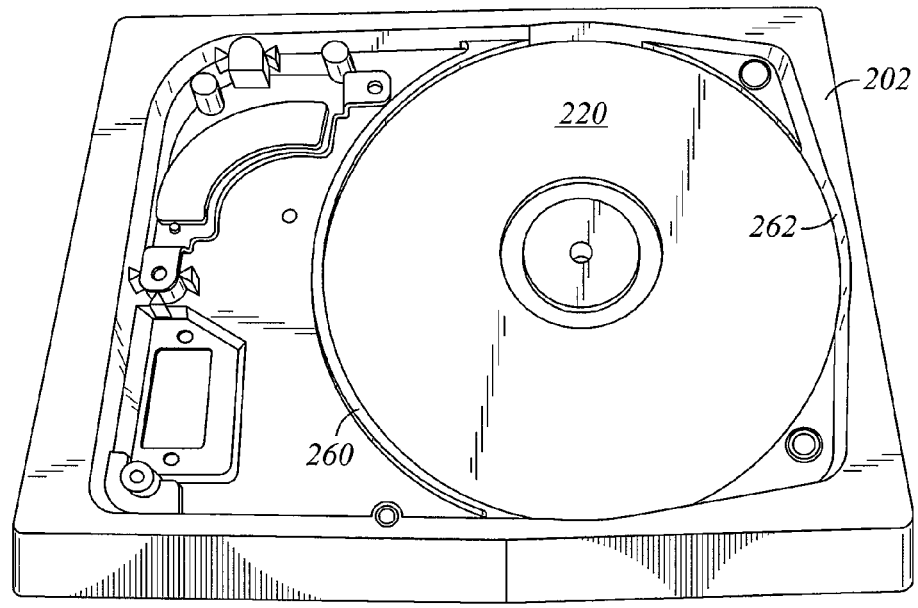
FIG. 3 is a top perspective view of a disk drive base according to an embodiment of the present invention.

FIG. 3 is a top perspective view of the disk drive base 202. Now referring additionally to FIG. 3, the cylindrical shroud wall 262 of the shroud 260 may surround a planar area 220 of the disk drive base 202. Also, the disk drive base 202 may be a cast aluminum disk drive base. Although cast baseplates include some machined surfaces, cast baseplates have unique structural characteristics that are different from stamped or forged baseplates, and/or baseplates that have been fabricated entirely by machining. For example, a person of ordinary skill can structurally distinguish cast baseplates based on tell-tale regions of substantially different surface finish (e.g. ejector pin marks, pitted or ground surfaces corresponding to injection gates, and/or mold parting lines). One of ordinary skill may also structurally distinguish cast baseplates based on draft angles on otherwise vertical surfaces that assist with mold separation.

Accordingly, the word "cast," as used herein, is an adjective describing a structural characteristic of the baseplate, rather than being used only as a process limitation. That is, a "cast baseplate" is a resulting structure that a person of ordinary skill would be able to distinguish from other types of baseplates based on structure alone, without previous knowledge of the manufacturing process. The fact that a cast baseplate structure is not obtained by other fabrication methods does not remove the structural significance of "cast"; rather it just adds additional process significance.

Although it may be functionally desirable for the cylindrical shroud wall 262 to be perfectly orthogonal to (i.e. at a 90° angle with) the planar area 220 in certain embodiments, in a cast baseplate the angle between these surfaces preferably differs from 90°, for example by a draft angle that is less than 5 degrees. The reason why a cast baseplate embodiment preferably has this feature, is to facilitate the release of the solidified baseplate from the casting mold. Specifically, the draft angle may facilitate separation of the casting mold-halves by ensuring that interior corners (in vertical cross-sections) are not less than 90°. Therefore, the phrase "substantially orthogonal," as used herein, contemplates and includes the possibility of a draft angle difference from perfect orthogonality.

Figure 4:
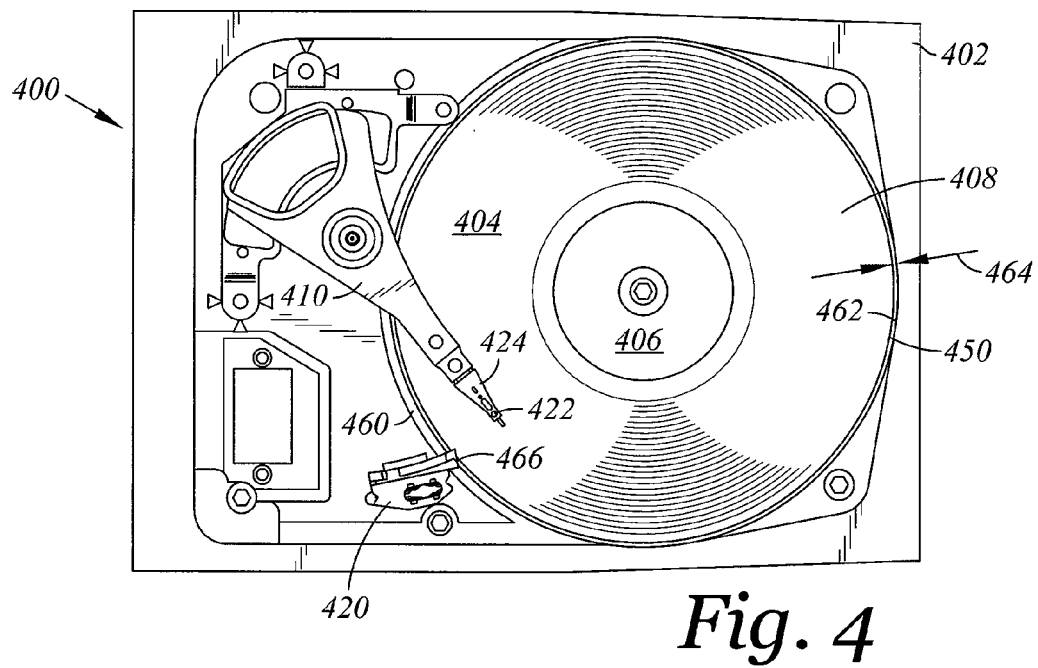
FIG. 4 is a top view of a disk drive according to another embodiment of the present invention.

FIG. 4 is a top view of a disk drive 400 according to another embodiment of the present invention. The disk drive 400 includes a disk drive base 402 and a disk drive cover that would be attached to the disk drive base 402. However, the disk drive cover is not shown in the view of FIG. 4 so that the internal components of the disk drive 400 will be visible. The disk drive 400 also includes a spindle 406 attached to the disk drive base 402. A first disk 404 is attached to the spindle 406. The first disk 404 has a first disk data side 408 and a first disk unread side (not visible because it is the disk underside as viewed in FIG. 4) that is opposite the first disk data side 408.

As shown in FIG. 4, the first disk 404 also has a first disk outer periphery 450. The disk drive 400 also includes a first read head 422 that faces and is disposed adjacent the first disk data side 408. Again in this context, "adjacent" means that no other facing disk surface is closer to the read head 422. The first read head 422 is attached to and is a subcomponent of a HGA 424 that is positioned by a rotary actuator 410. For example, the rotary actuator 410 may position the HGA 424 towards or away from a head loading ramp 420, by which action the head 422 may be unloaded from or loaded upon the first disk data side 408.

In the embodiment of FIG. 4, the disk drive 400 also includes a first shroud 460 having a first cylindrical shroud wall 462 that is substantially orthogonal to the first disk unread side and that completely encircles the first disk outer periphery 450. In this embodiment, the phrase "completely encircles" means that, although the first shroud 460 includes a gap 466, that gap 466 is substantially filled by the head loading ramp 420, which comprises a concatenated portion of the first cylindrical shroud wall 462.

In the embodiment of FIG. 4, a radial spacing 464 between the first cylindrical shroud wall 462 and the first disk outer periphery 450 nowhere exceeds 1 mm. In certain embodiments, this dimensional inequality may enhance damping of undesirable flutter of the disk 404. Although, in the embodiment of FIG. 4, the first cylindrical shroud wall 462 is an integral feature of the disk drive base 402, in certain alternative embodiments the first shroud may contact and be attached to the disk drive base 402 instead.

Now referring again to the embodiment of FIG. 2, the disk drive 200 does not include any read head that faces and is disposed adjacent the first disk unread side. In this context, being "adjacent" a disk side means closer to that disk side than to any other disk side. When a disk drive is depopulated, there will be a side of a disk on which no head reads, and that side is considered as an "unread" side. For example, in the embodiment of FIG. 2, the bottom side of the disk 204 is a side on which no head reads, and that side is considered as an "unread" side.

Also, in the embodiment of FIGS. 2 and 3, the first disk unread side faces and is approximately parallel to the planar area 220 of the disk drive base 202. Also, the first disk unread side is adjacent the planar area 220 of the disk drive base 202 in the sense that no other disk or side is closer to the planar area 220 of the disk drive base 202. For example, the first disk unread side may be separated from the planar area 220 of the disk drive base 202 by an axial spacing that is no more than 1 mm. In certain embodiments, this dimensional inequality may enhance an ability of a squeeze film to damp or otherwise stabilize undesirable flutter of the disk 204.

Figure 5:
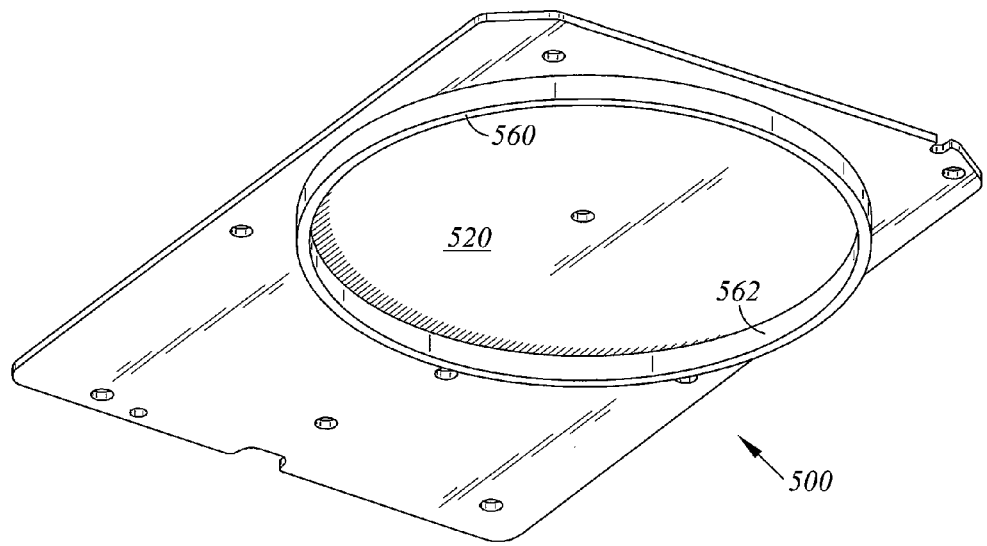
FIG. 5 is an underside perspective view of a disk drive top cover, according to another embodiment of the present invention.

However, in certain alternative embodiments, the top side of the uppermost disk of a depopulated disk drive may be an unread side. In such embodiments, the first disk unread side may instead face and be adjacent the disk drive cover, in the sense that no other disk or side is closer to the disk drive cover. FIG. 5 is an underside perspective view of a disk drive cover 500 according to such an alternative embodiment. Now referring additionally to FIG. 5, in certain embodiments a shroud 560 (e.g. an injection molded plastic shroud) having a cylindrical shroud wall 562 may contact and be attached to the disk drive cover 500 (for example by adhesive). However in an alternative embodiment the cylindrical shroud wall 562 may be an integral feature of the disk drive cover 500, for example if the shroud 560 is instead fabricated by forming a circular dent in the cover 500. The cylindrical shroud wall 562 of the shroud 560 may surround a planar area 520 of the disk drive base cover 500.

Figure 6:
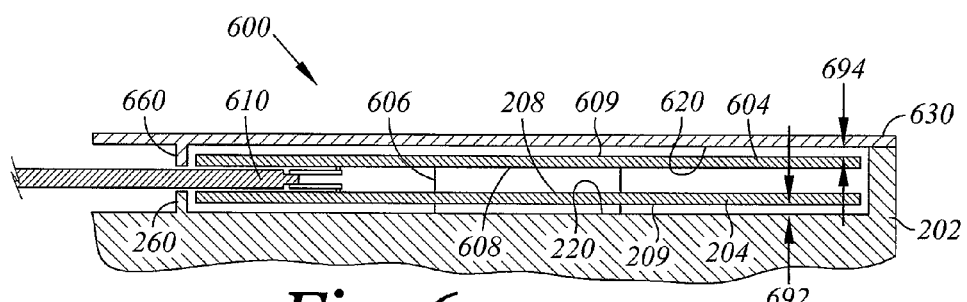
FIG. 6 is a side cross-sectional view of a disk drive according to another embodiment of the present invention.

It is also contemplated that a depopulated disk drive may have more than one disk attached to the spindle. For example, FIG. 6 depicts a side cross-sectional view of a disk drive 600 according to an embodiment of the present invention that includes two disks 204, 604 attached to a spindle 606. Optionally there may be one or more intermediate disks between the first disk 204 and the second disk 604. The first disk 204 includes a first disk unread side 209 facing and adjacent a planar area 220 of a base plate 202. The second disk 604 includes a second disk unread side 609 facing and adjacent a planar area 620 of a cover 630. In the embodiment of FIG. 6, the second disk unread side 609 may be separated from the planar area 620 of the disk drive cover 630 by an axial spacing 694 that is no more than 1 mm. Also in the embodiment of FIG. 6, the first disk unread side 209 may be separated from the planar area 220 of the disk drive base 202 by an axial spacing 692 that is no more than 1 mm. In certain embodiments, these dimensional inequalities may enhance an ability of squeeze films to damp or otherwise stabilize undesirable flutter of the disks.

In the embodiment of FIG. 6, the first disk unread side 209 is opposite a first disk data side 208, and the second disk unread side 609 is opposite a second disk data side 608. An actuator arm 610 supports read heads that face and are disposed adjacent the first and second disk data sides 208, 608, but no read heads face and are disposed adjacent the first and second disk unread sides 209, 609. The first disk data side 208 may face the second disk data side 608, and any intermediate disk(s), if present, would be disposed between the first disk data side 208 and the second disk data side 608. Also, since such a multi-disk depopulated disk drive may have two disk unread sides (e.g. 208, 608), it may have a total number of read heads that is two fewer than twice a total number of disks.

A multi-disk depopulated disk drive, like disk drive 600, may include both a base plate shroud 260 and a cover shroud 660. The cover shroud 660 may include a cover cylindrical shroud wall that is substantially orthogonal to the second disk unread side 609. Whereas the cover shroud 560 of FIG. 5 includes a cover shroud wall 562 that completely encircles a disk outer periphery, the cover shroud 660 of FIG. 6 contributes a portion of a shroud wall that, together with another portion provided by the disk drive base 202, completely encircles the outer periphery of the second disk 604. Preferably but not necessarily, a radial spacing between the cylindrical wall of the cover shroud 660, and the outer periphery of the second disk 604, nowhere exceeds 1 mm. In certain embodiments, this dimensional inequality may enhance damping of undesirable disk vibrations. Increasing shroud-contributed damping of the top and/or bottom disk may, in turn, increase overall damping of undesirable vibrations of the whole disk stack, in certain multi-disk depopulated disk drive embodiments.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. The terms "comprising," "including," "with," and "having," as used herein, are intended to be read as open-ended terms.

We claim:

1. A disk drive comprising:
   a disk drive base and a disk drive cover attached to the disk drive base;
   a spindle attached to the disk drive base;
   a first disk attached to the spindle, the first disk including a first disk data side and a first disk unread side that is opposite the first disk data side, the first disk also including a first disk outer periphery;
   a first read head that faces and is disposed adjacent the first disk data side; and
   a first cylindrical shroud wall that is substantially orthogonal to the first disk unread side and that completely encircles the first disk outer periphery with a radial spacing between the first cylindrical shroud wall and the first disk outer periphery that nowhere exceeds 1 mm, the first cylindrical shroud wall comprising:
   a first shroud;
   a gap disposed within the first shroud; and
   a head loading ramp which substantially fills the gap to serve as a concatenated portion of the first cylindrical shroud wall.

2. The disk drive of claim 1 wherein the first disk unread side faces and is adjacent the disk drive base.

3. The disk drive of claim 2 wherein the first cylindrical shroud wall is an integral feature of the disk drive base.

4. The disk drive of claim 2 wherein the first shroud contacts and is attached to the disk drive base.

5. The disk drive of claim 2 further comprising:
   a second disk attached to the spindle, the second disk having a second disk data side and a second disk unread side that is opposite the second disk data side, the second disk also having a second disk outer periphery;
   a second read head that faces and is disposed adjacent the second disk data side; and
   a second shroud having a second cylindrical shroud wall that is substantially orthogonal to the second disk unread side and that completely encircles the second disk outer periphery with a radial spacing between the second cylindrical shroud wall and the second disk outer periphery that nowhere exceeds 1 mm;
   wherein the disk drive does not include any read head that faces and is disposed adjacent the second disk unread side.

6. The disk drive of claim 5 wherein the second disk unread side faces and is adjacent the disk drive cover.

7. The disk drive of claim 6 wherein the first disk data side faces the second disk data side.

8. The disk drive of claim 7 wherein the disk drive has no read heads other than the first read head and the second read head.

9. The disk drive of claim 6 further comprising at least one intermediate disk that is disposed between the first disk data side and the second disk data side.

10. The disk drive of claim 9 wherein the disk drive has a total number of read heads that is two fewer than twice a total number of disks.

11. The disk drive of claim 2 wherein the first disk unread side is separated from the disk drive base by an axial spacing that is no more than 1 mm.

12. The disk drive of claim 1 wherein the first disk unread side faces and is adjacent the disk drive cover.

13. The disk drive of claim 12 wherein first cylindrical shroud wall is an integral feature of the disk drive cover.

14. The disk drive of claim 12 wherein the first shroud contacts and is attached to the disk drive cover.

15. The disk drive of claim 12 wherein first disk unread side is separated from the disk drive cover by an axial spacing that is no more than 1 mm.

16. The disk drive of claim 1 wherein the disk drive base is a cast aluminum disk drive base.

17. The disk drive of claim 16 wherein the first cylindrical shroud wall is disposed at an angle relative to the first disk unread side that is different from 90° by a draft angle that is less than 5 degrees.

* * * * *